United States Patent
Hong et al.

(10) Patent No.: US 7,019,754 B2
(45) Date of Patent: Mar. 28, 2006

(54) APPARATUS AND METHOD FOR GENERATING TEXTURE MAPS FOR USE IN 3D COMPUTER GRAPHICS

(75) Inventors: Qi He Hong, Bracknell (GB); Adam Michael Baumberg, Bracknell (GB); Alexander Ralph Lyons, Bracknell (GB)

(73) Assignee: Canon Europa N.V., Amstelveen (NL)

( * ) Notice: Subject to any disclaimer, the term of this patent is extended or adjusted under 35 U.S.C. 154(b) by 14 days.

(21) Appl. No.: 10/684,378

(22) Filed: Oct. 15, 2003

(65) Prior Publication Data
US 2004/0104916 A1    Jun. 3, 2004

(30) Foreign Application Priority Data
Oct. 29, 2002    (GB)    .................... 0225156

(51) Int. Cl.
G09G 5/00    (2006.01)
(52) U.S. Cl. .................. 345/582; 345/619; 345/630
(58) Field of Classification Search ................ 345/418, 345/581–588, 619, 630
See application file for complete search history.

(56) References Cited

U.S. PATENT DOCUMENTS

| | | | |
|---|---|---|---|
| 5,572,636 A | 11/1996 | Sakuraba et al. ........... 395/130 |
| 6,009,190 A | 12/1999 | Szeliski et al. ............. 382/154 |
| 6,516,099 B1 | 2/2003 | Davison et al. ............. 382/284 |
| 6,647,146 B1 | 11/2003 | Davison et al. ............. 382/199 |
| 6,762,769 B1 * | 7/2004 | Xu et al. ..................... 345/582 |
| 6,791,540 B1 | 9/2004 | Baumberg ................... 345/419 |
| 6,867,772 B1 | 3/2005 | Kotcheff et al. ............ 345/420 |
| 2002/0085748 A1 | 7/2002 | Baumberg ................... 382/154 |
| 2002/0154132 A1 * | 10/2002 | Dumesny et al. ............ 345/582 |
| 2003/0001837 A1 | 1/2003 | Baumberg ................... 345/419 |
| 2003/0063086 A1 | 4/2003 | Baumberg ................... 345/420 |
| 2004/0075666 A1 * | 4/2004 | Ritter .......................... 345/582 |

FOREIGN PATENT DOCUMENTS

EP    1 204 073 A2    3/2001
WO    WO 00/04506    1/2000

OTHER PUBLICATIONS

Kim et al., "Jigsaw Image Mosaics", ACM SIGGRAPH 2002 Conference Proceedings, pp. 657–664 (2002).

* cited by examiner

Primary Examiner—Matthew C. Bella
Assistant Examiner—Wesner Sajous
(74) Attorney, Agent, or Firm—Fitzpatrick, Cella, Harper & Scinto (57) ABSTRACT

There is disclosed an apparatus and method for combining three or more texture maps 200–208 together to generate a single, combined texture map 220. The texture maps are repeatedly combined together in pairs, with each pair generating a larger texture map for subsequent combination with another texture map, until only one texture map remains containing all of the original texture maps.

21 Claims, 8 Drawing Sheets

APPARATUS AND METHOD FOR GENERATING TEXTURE MAPS FOR USE IN 3D COMPUTER GRAPHICS

This application claims the right of priority under 35 USC § 119 based on British patent application number 0225156.9 filed 29 Oct. 2002, which is hereby incorporated by reference herein in its entirety as if fully set forth herein.

The present invention relates to the field of three-dimensional (3D) computer graphics, and more particularly to the generation of a texture map for use in rendering an image of a three-dimensional computer model.

The technique of texture mapping is well known in the field of 3D computer graphics. In this technique, an image (either digitised or synthesised) known as a "texture map" is stored and mapped on to one or more surfaces of a three-dimensional computer model during rendering to represent surface detail in the final image of the model. The texture map is made up of a two-dimensional matrix of individual elements known as "texels" (like the pixels of an image) and, typically, a respective red, green and blue value is stored for each texel to define the texture data in the texture map.

Coordinates defining a point in the texture map are assigned to each vertex of each polygon in the 3D computer model on to which texture data is to be mapped during rendering. In this way the assigned texture map coordinates for a polygon's vertices define a corresponding polygon in the texture map containing the texture data which is to be mapped on to the 3D model polygon during rendering.

Often, a number of different, separate texture maps are generated for a single 3D computer model. For example, EP-A-1,204,073 describes a system in which six texture maps are generated for a 3D computer model, each texture map comprising texture data for a view of the 3D computer model from a respective one of the six faces of a cuboid containing the 3D computer model. In other cases, a plurality of texture maps are generated for different 3D computer models.

A number of problems arise, however, in the processing of multiple texture maps, either for a single 3D computer model or a plurality of 3D computer models.

For example, some 3D computer graphics applications and some 3D computer model renderers can process only a single texture map per 3D computer model. Furthermore, some applications and renderers require the single texture map to have a square shape.

In addition, when editing of texture maps is required, it is often more convenient to edit a single texture map rather than multiple texture maps. For example, consistency and uniformity of editing can be achieved if an edit operation is applied once to a single texture map, but consistency and uniformity may not be achieved if the operation is performed separately on different texture maps.

The present invention aims to address one or more of the problems above.

According to the present invention, there is provided a method, performed in a processing apparatus, of processing data defining at least three two-dimensional rectangular texture maps to generate data defining a single two-dimensional rectangular texture map containing all of the starting texture maps. The method includes combining two of the texture maps by arranging them adjacent each other with an edge of one texture map parallel to an edge of the other texture map, and defining a rectangle containing the two texture maps, thereby generating a new texture map for subsequent combination and repeating the combining processing to combine texture maps in pairs, to generate a single two-dimensional rectangle containing the starting texture maps. The at least three two-dimensional rectangular texture maps that are combined include texture maps of different respective sizes.

Embodiments of the invention will now be described, by way of example only, with reference to the accompanying drawings, in which:

FIG. 3 comprising FIGS. 3*a* and 3*b* shows the processing operations performed by the processing apparatus in FIG. 1;

Figure 1:
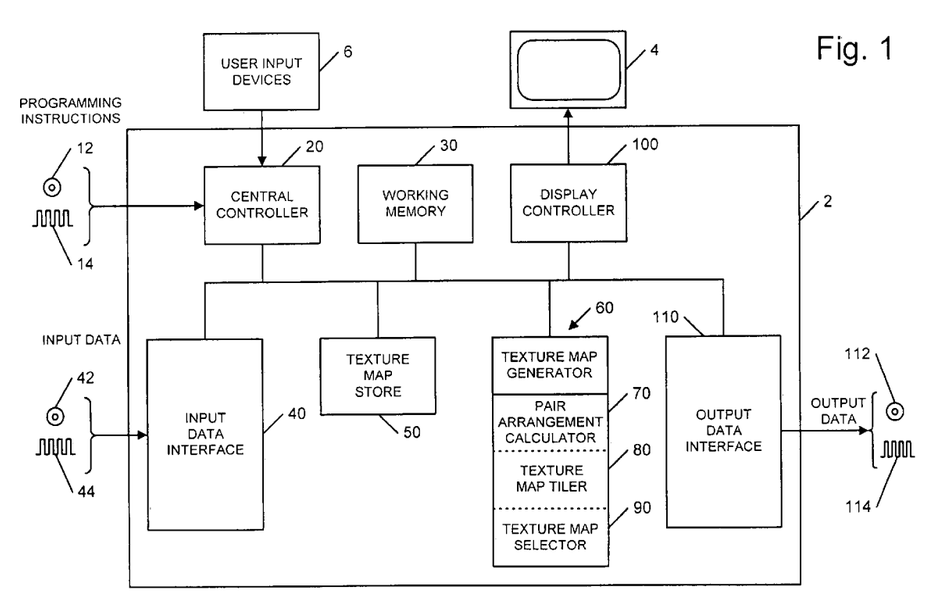
FIG. 1 schematically shows the components of an embodiment of the invention, together with the notional functional processing units and data stores into which the processing apparatus component may be thought of as being configured when programmed by programming instructions.

Referring to FIG. 1, an embodiment of the invention comprises a processing apparatus 2, such as a personal computer, containing, in a conventional manner, one or more processors, memories, graphics cards etc, together with a display device 4, such as a conventional personal computer monitor, and user input devices 6, such as a keyboard, mouse etc.

The processing apparatus 2 is programmed to operate in accordance with programming instructions input, for example, as data stored on a data storage medium 12 (such as an optical CD ROM, semiconductor ROM, or magnetic recording medium, etc), and/or as a signal 14 (for example an electrical or optical signal input to the processing apparatus 2, for example from a remote database, by transmission over a communication network such as the Internet or by transmission through the atmosphere), and/or entered by a user via a user input device 6 such as a keyboard.

Figure 2:
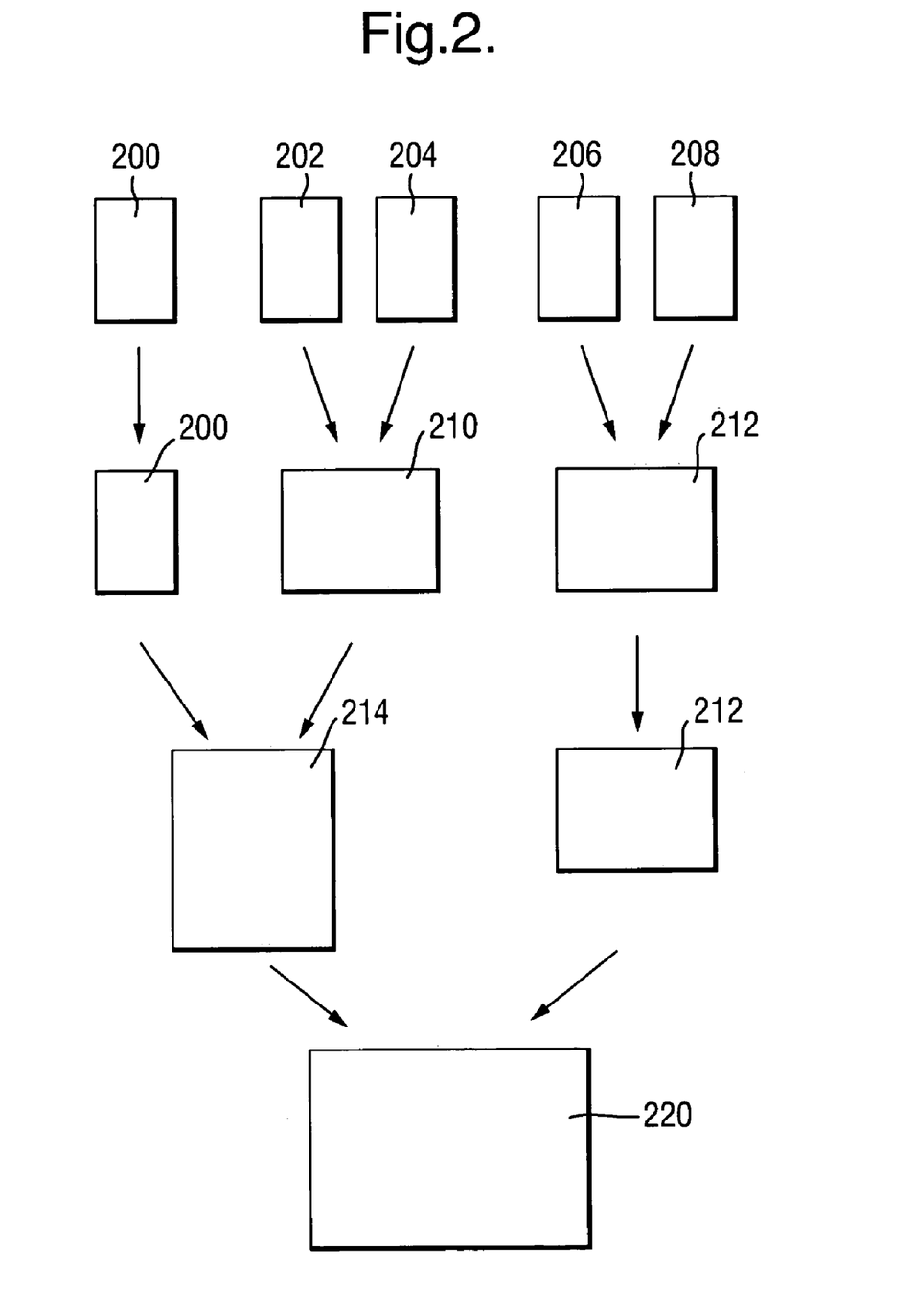
FIG. 2 shows an example to schematically illustrate the recursive tiling of texture maps in pairs to generate a single texture map.

As will be described in more detail below, the programming instructions comprise instructions to cause the processing apparatus 2 to become configured to tile a plurality of input texture maps into a single texture map. Referring to FIG. 2, which shows a schematic example to illustrate the processing by processing apparatus 2, processing apparatus 2 is programmed to become operable to combine the input texture maps 200–208 together in pairs, with each pair forming a larger texture map block 210, 212. The pairing process is performed recursively to generate a larger texture map block 214, together with texture block 212, and until all of the input texture maps 200–208 have been tiled into a single texture map 220. The pairing of the input texture maps 200–208 and the pairing at each subsequent level of recursion is performed exhaustively to consider every possible tiling arrangement of the input texture maps. The single texture map 220 having the "best" tiling arrangement is then selected (the "best" arrangement in this embodiment being the single texture map 220 having the smallest area while having a shape which is sufficiently square).

When programmed by the programming instructions, processing apparatus 2 can be thought of as being configured as a number of functional units for performing processing operations and a number of data stores configured to store data. Examples of such functional units and data stores together with their interconnections are shown in FIG. 1. The functional units, data stores and interconnections illustrated in FIG. 1 are, however, notional, and are shown for illustration purposes only to assist understanding; they do not necessarily represent the units, data stores and connections into which the processors, memories etc of the processing apparatus 2 actually become configured.

Referring to the functional units shown in FIG. 1, a central controller 20 is arranged to process inputs from the user input devices 6, and also to provide control and processing for the other functional units working memory 30 is provided for use by central controller 20 and the other functional units.

Input data interface 40 is arranged to receive, and write to memory, input data input to the processing apparatus 2, for example as data stored on a storage medium 42 or carried by a signal 44 transmitted to the processing apparatus 2. The input data comprises data defining a plurality of two-dimensional (2D) texture maps (for example texture maps 200–208 in the example of FIG. 2), each comprising a 2D array of texels. Any number (greater than one) of texture maps may be input, and each of the input texture maps may be of arbitrary area and dimensions, so that the texture maps may have different sizes (even though the texture maps 200–208 illustrated in FIG. 2 are shown with the same area and dimensions).

Texture map store 50 is configured to store the input data defining the texture maps 200–208.

Texture map generator 60 is operable to process the input data defining the plurality of texture maps 200–208 to tile the input texture maps 200–208 into a single texture map 220.

Texture map generator 60 comprises a pair arrangement calculator 70, a texture map tiler 80, and a texture map selector 90.

Pair arrangement calculator 70 is operable to determine each possible arrangement of texture map pairs or texture block pairs to be combined for the current level of recursion of the pairing being performed by texture map generator 60. Thus, referring to the example shown in FIG. 2, pair arrangement calculator 70 is operable to determine each unique arrangement of texture map pairs from the input texture maps 200–208, each unique arrangement of pairs from the input texture map 200 and the texture blocks 210, 212, and each unique arrangement of pairs from the texture blocks 214 and 212. It should be noted that, in this embodiment, if there are an odd number of texture maps and/or texture blocks to be combined for any given level of recursion (for example the five texture maps 200–208) then one of the texture maps/texture blocks will unpaired in any pairing arrangement determined by pair arrangement calculator 70. Thus, for example, texture map 200 remains unpaired in the pairing arrangement shown in the example of FIG. 2 when texture maps 202 and 204 are paired and texture maps 206 and 208 are paired. On the other hand, when there are an even number of texture maps and/or texture blocks to be combined, then each texture map/texture block will form part of a pair in each pairing arrangement determined by pair arrangement calculator 70.

Texture map tiler 80 is operable to tile together each pair of texture maps and/or texture blocks defined by pair arrangement calculator 70, to generate a larger texture map. Thus, for example, texture map tiler 80 is operable to tile texture maps 202 and 204 together to generate texture block 210.

Texture map selector 90 is operable to select a final, single texture map 220 from among the plurality of single texture maps 220 generated as a result of the exhaustive pairing performed by pair arrangement calculator 70 and texture map tiler 80 To make the selection, texture map selector 90 is arranged to consider the height and width of each single texture map 220 and to make a selection in dependence upon these lengths.

Display controller 100, under the control of central controller 20, is operable to generate image data for display showing the texture map generated by texture map generator 60. Display controller 100 is further operable to control display device 4 to display the generated image data.

Output data interface 110 is operable to output data from processing apparatus 2 for example as data on a storage medium 112 (such as an optical CD ROM, semiconductor ROM or magnetic recording medium, etc) and/or as a signal 114 (for example an electrical or optical signal transmitted over a communication network such as an Internet or through the atmosphere). In this embodiment, the output data comprises data defining the texture map generated by texture map generator 60.

A recording of the output data may be made by recording the output signal 114 either directly or indirectly (for example by making a subsequent copy) using recording apparatus (not shown).

Figure 3A:
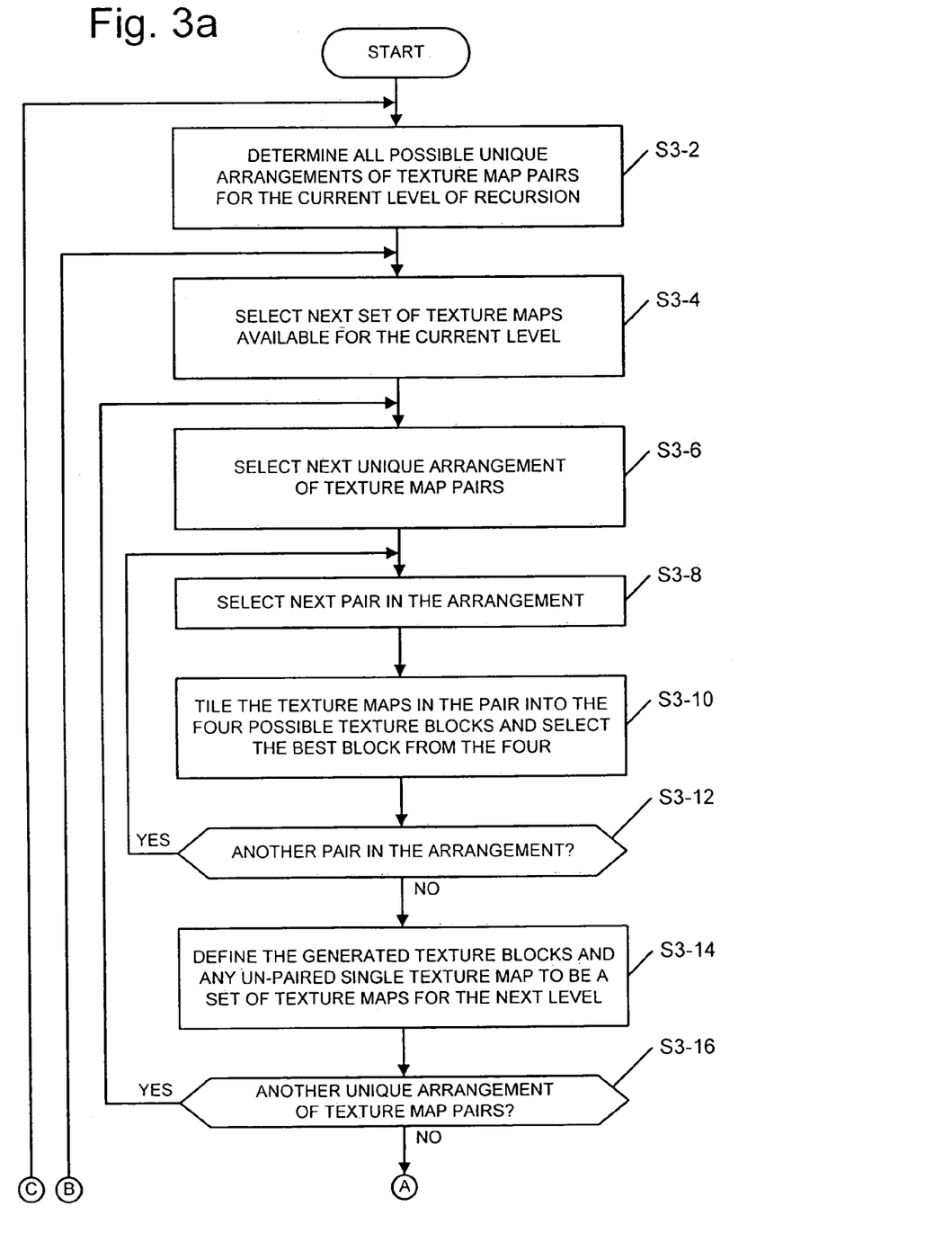
Figure 3B:
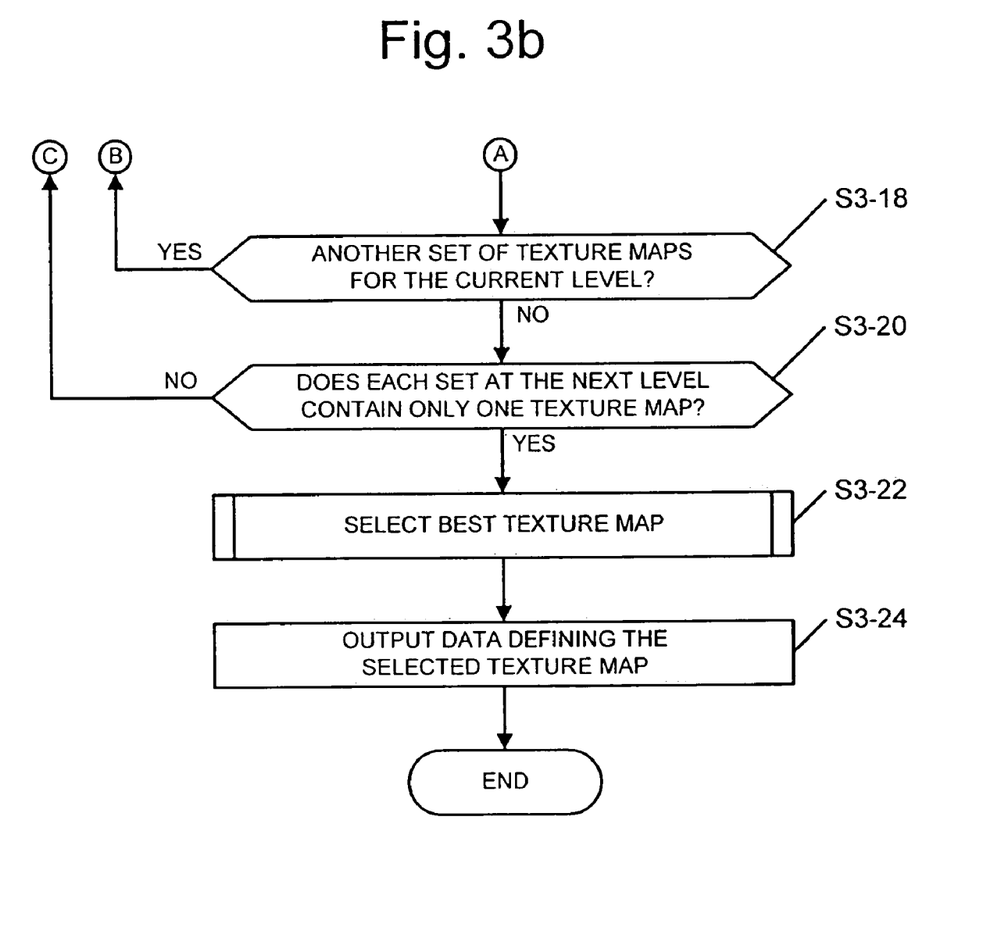

FIG. 3 shows the processing operations performed by processing apparatus 2 in this embodiment.

Referring to FIG. 3, at step S3-2, pair arrangement calculator 70 determines all of the possible unique arrangements of texture map pairs for the current level of recursion.

Figure 4:
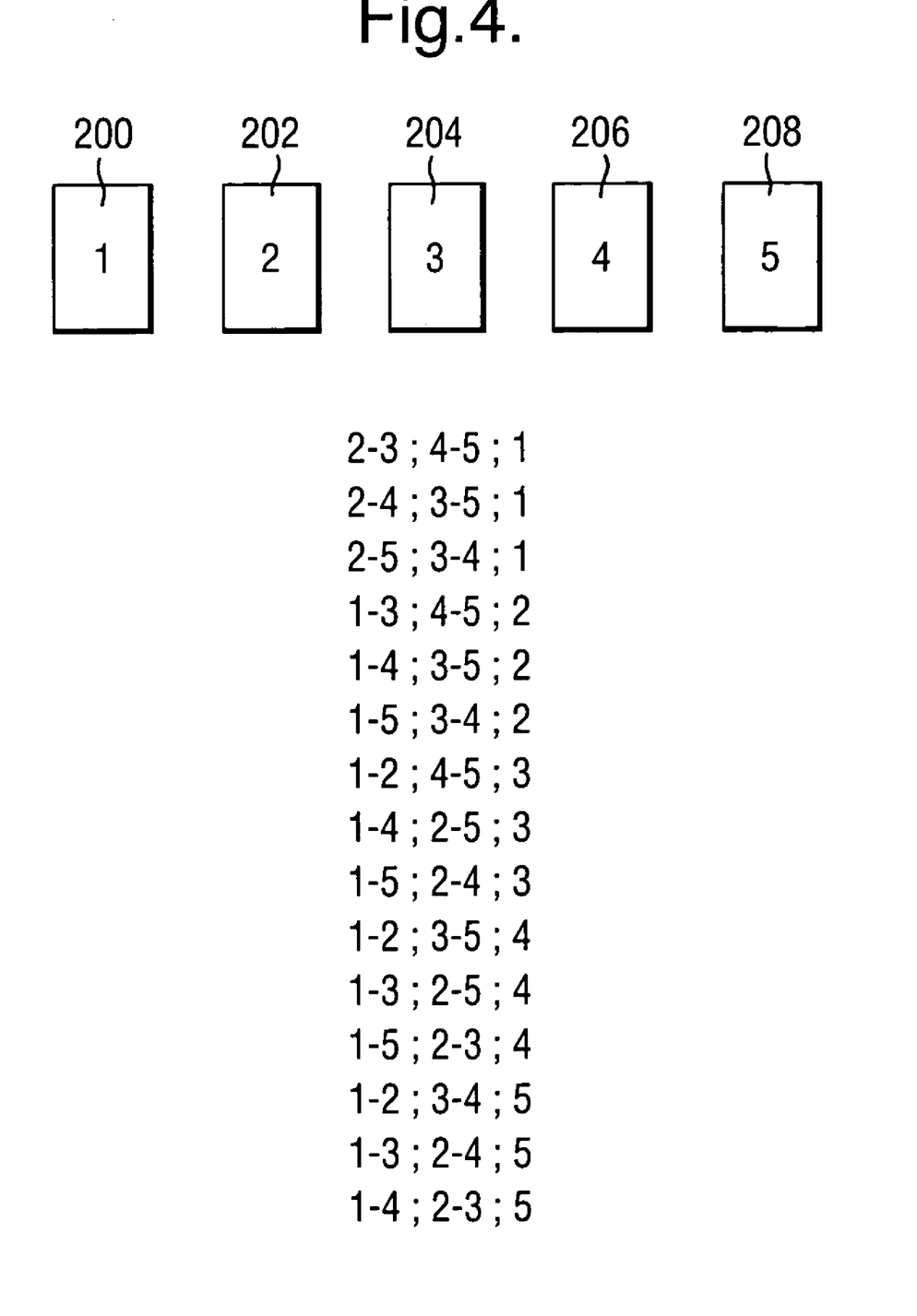
FIG. 4 sets out the fifteen unique arrangements of texture map pairs possible for five texture maps.

The first time step S3-2 is performed, pair arrangement calculator 70 determines all possible unique pairing arrangements of the input texture maps. Thus, referring to FIG. 4 by way of example, in the case where there are five input texture maps 200–208 (corresponding to the input texture maps shown in the example of FIG. 2), pair arrangement calculator 70 determines each unique arrangement in which four of the texture maps are arranged in pairs and one of the texture maps is unpaired. For five texture maps 200–208, fifteen such unique arrangements are possible. These unique pair arrangements are set out beneath the texture maps 200–208 in FIG. 4 using the numbers 1 to 5 shown in each texture map and a dash between numbers to define texture maps which are paired together. Thus, for example, in the first pair arrangement, texture maps 2 and 3 (that is, 202, 204) are paired together, texture maps 4 and 5 (that is, 206, 208) are paired together and texture map 1 (that is, 200) remains unpaired. This corresponds to the pairing arrangement illustrated in FIG. 2. Similarly, in the second unique arrangement, texture maps 2 and 4 are paired together, texture maps 3 and 5 are paired together and texture map 1 remains unpaired. As explained above, fifteen unique arrangements of this kind are possible, as defined in FIG. 4.

Referring again to FIG. 3, at step S3-4, texture map generator 60 selects the next set of texture maps available for the current level of recursion. The first time step S3-4 is performed, the only set of texture maps available for processing is the set of input texture maps 200–208. However, as will be explained below, the processing carried out at each level of recursion generates a plurality of sets of texture maps for subsequent processing at the next level of recursion (the number of sets generated being dependent upon the number of unique arrangements of texture map pairs determined at step S3-2).

At step S3-6, texture map generator 60 selects the next unique arrangement of texture map pairs from those determined at step S3-2 (this being the first unique arrangement for the current level of recursion the first time step S3-6 is performed), and at step S3-8 selects the next pair of texture maps in the arrangement selected at step S3-6. Thus, referring to the example shown in FIGS. 2 and 4, the pair of texture maps 202 and 204 is selected the first time step S3-8 is performed.

At step S3-10, texture map tiler 80 tiles the texture maps selected at step S3-8 into the four different possible texture block arrangements and selects the "best" arrangement from the four. This processing will now be explained with reference to the example shown in FIG. 5.

Figure 5:
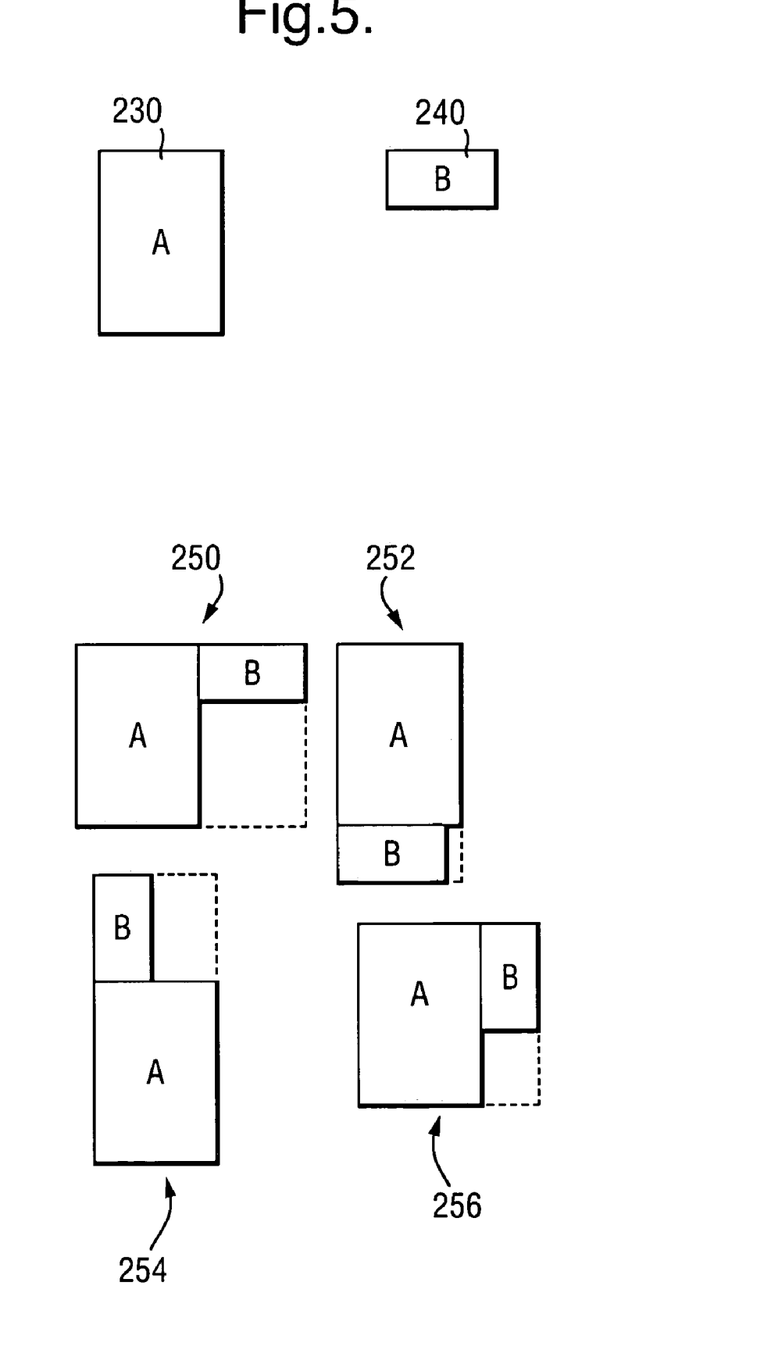
FIG. 5 illustrates the processing performed at step S3-10 in FIG. 3.

Referring to FIG. 5, in the example, texture maps 230, 240, labelled "A" and "B" represent the two texture maps to be tiled together.

The texture maps 230, 240 can be tiled together in four different possible arrangements 250, 252, 254, 256. In each arrangement, the texture maps are arranged side-by-side with parallel edges and, in this embodiment, an edge of one texture map abuts an edge of the other texture map. Consequently, no distortion of the texture data in either texture map occurs because the shapes of both texture maps are unchanged by the tiling process.

The resulting combined texture block is defined by the bounding rectangle around the tiled texture maps 230, 240, that is, the smallest rectangle which encloses the texture maps 230, 240. Thus, the bounding rectangle is defined so that its edges lie along the outer edges of the tiled pair of texture maps, with the edge lengths of the bounding rectangle defined by the edge lengths of the texture maps therein so that the bounding rectangle defines the two-dimensional extents of the tiled texture maps. Referring to arrangement 250 in FIG. 5, therefore, the height of the bounding rectangle is equal to the longest edge length of texture map A, and the width of the bounding rectangle is equal to the sum of the shortest edge length of texture map A and the longest edge length of texture map B. Similarly, in arrangement 252, the height of the bounding rectangle is equal to the sum of the longest edge length of texture map A and the shortest edge length of texture map B, and the width of the bounding rectangle is equal to the length of the shortest edge of texture map A.

Because each combined texture block is defined by the bounding rectangle enclosing the two texture maps 230, 240, the position of each texture map 230, 240 inside the bounding rectangle is unimportant (such that that rotations of the resulting texture map block are not treated as different texture map blocks) and only four different arrangements are possible for any pair of texture maps. More particularly, the four different arrangements comprise the longest side of texture map A abutting the shortest side of texture map B (arrangement 250 in FIG. 5), the shortest side of texture map A abutting the longest side of texture map B (arrangement 252), the shortest side of texture map A abutting the shortest side of texture map B (arrangement 254), and the longest side of texture map A abutting the longest side of texture map B (arrangement 256).

At step S3-10, texture map tiler 80 tiles the two texture maps 230, 240 being processed to generate each of the four arrangements 250, 252, 254, 256, and then selects the arrangement from the four which has the bounding rectangle of smallest area. The selected tiling arrangement is retained, while the other three arrangements are discarded.

Referring again to FIG. 3, at step S3-12, texture map generator 60 determines whether there is another pair of texture maps to be tiled in the unique pairing arrangement currently being processed. Steps S3-8 to S3-12 are repeated until each pair of texture maps in the current unique arrangement have been tiled in the way described above, with any unpaired texture map being retained unchanged. Consequently, referring to the example shown in FIG. 2, as a result of the processing at steps S3-8 to S3-12 texture blocks 210 and 212 are generated texture map 200 remains unchanged.

At step S3-14, texture map generator 60 defines the tiled texture maps generated at step S3-10 and any unpaired single texture map in the current arrangement to be a set of texture maps to be processed at the next level of recursion. Thus, referring to the example shown in FIGS. 2 and 4, when steps S3-6 to S3-14 are performed for a unique arrangement of the five input texture maps 200–208, a set of three texture maps 200, 210, 212 is generated for subsequent processing at the next level of recursion (the set of three texture maps comprising two tiled texture maps 210, 212 generated as a result of the processing at step S3-10 together with un-paired texture map 200).

At step S3-16, texture map generator 60 determines whether there is another unique arrangement of texture map pairs to be processed (that is, whether another unique arrangement determined at step S3-2 for the current level of recursion remains to be processed). Steps S3-6 to S3-16 are repeated until each unique arrangement of texture map pairs determined at step S3-2 for the current level of recursion has been processed in the way described above.

As a result of this processing, each unique arrangement determined at step S3-2 generates a respective set of texture maps for processing at the next recursion level.

Figure 6:
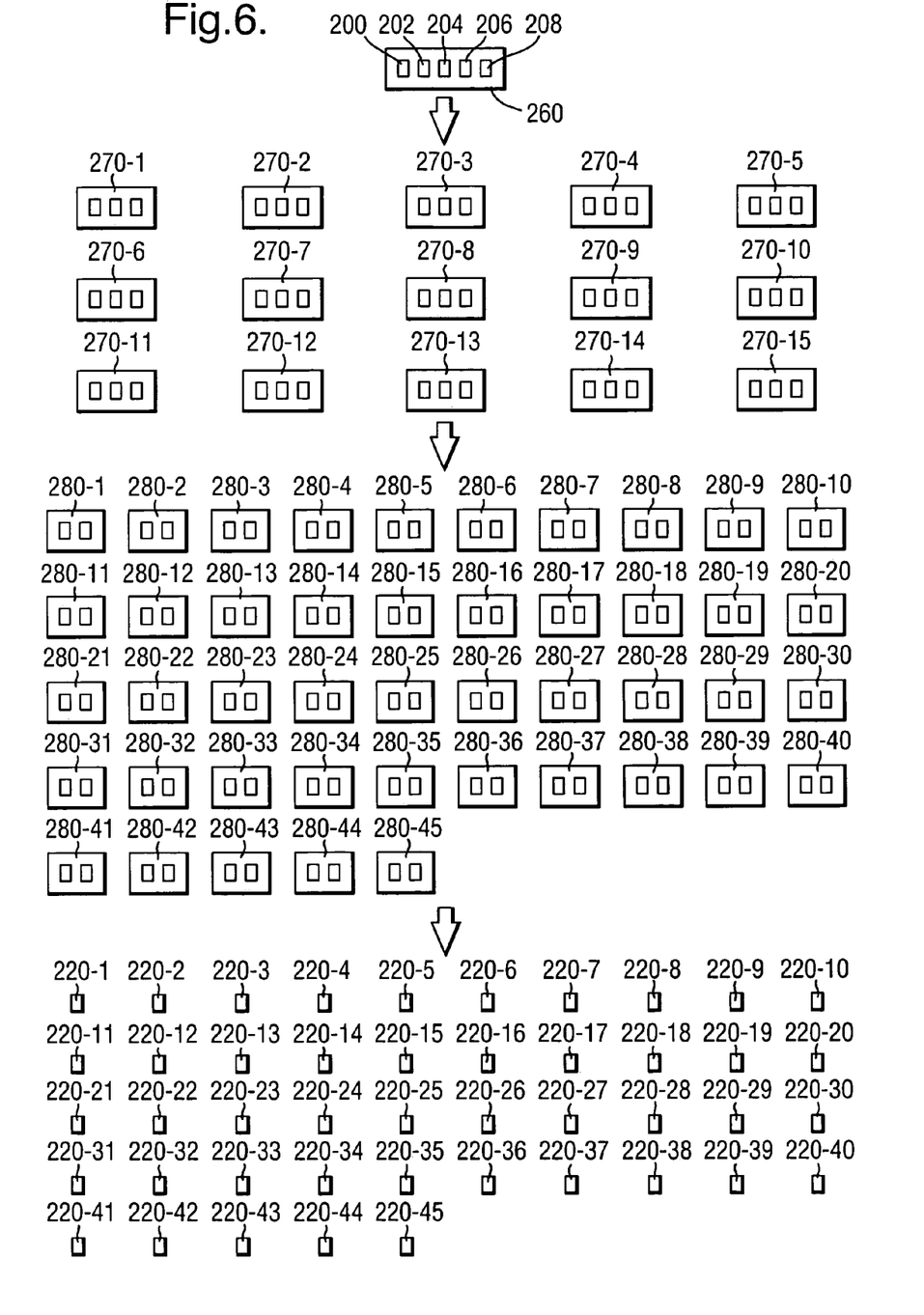
FIG. 6 schematically illustrates the generation of sets of texture maps at different levels of recursion of the processing in FIG. 3.

As explained above with reference to the example shown in FIG. 4, fifteen unique arrangements of texture map pairs are possible for the five input texture maps 200–208. Consequently, the processing at steps S3-6 to S3-16 for the first level of recursion generates fifteen respective sets of texture maps for processing on the next level of recursion, each respective set containing three texture maps (for example texture maps 200, 210 and 212 in the example of FIG. 2). This generation of sets is schematically illustrated in FIG. 6, in which the single set 260 of five input texture maps 200–208 generates fifteen sets 270-1 to 270-15 of texture maps, each comprising three texture maps.

Referring again to FIG. 3, at step S3-18, texture map generator 60 determines whether there is another set of texture maps to be processed for the current level.

Steps S3-4 to S3-18 are repeated until each set of texture maps has been processed in the way described above.

The input texture maps 200–208 comprise only a single set 260. Consequently, steps S3-4 to S3-18 are performed only once for the input texture maps 200–208 (that is, the first level of recursion).

At step S3-20, texture map generator 60 determines whether each set of texture maps at the next level contains only a single texture map. Steps S3-2 to S3-20 are repeated until each set of texture maps for the next level contains only a single texture map.

As explained above, the processing of the five input texture maps 200–208 generates fifteen sets of texture maps 270-1 to 270-15, each containing three texture maps. Accordingly, when step S3-20 is performed after the first level of recursion, each set for the next level contains three texture maps and therefore processing returns to step S3-2.

When processing returns in this way, because each set 270-1 to 270-15 contains three texture maps, three unique arrangements of texture maps are defined at step S3-2 (each containing one pair of texture maps and a single, unpaired texture map). Steps S3-4 to S3-18 are then performed fifteen times, once for each of the respective sets 270-1 to 270-15.

Each time steps S3-4 to S3-18 are performed for a set, three sets of texture maps for the next level of recursion are generated (one for each of the unique arrangements of texture map pairs in the set determined at step S3-2) with each generated set containing two texture maps. Consequently, as schematically illustrated in FIG. 6, the processing of the fifteen sets 270-1 to 270-15 at steps S3-4 to S3-18 generates forty-five sets of texture maps 280-1 to 280-45, each containing two texture maps.

On the next level of recursion, therefore, steps S3-4 to S3-18 are performed forty-five times, once for each of the sets 280-1 to 280-45.

Since each of the sets 280-1 to 280-45 contains two texture maps, only one unique arrangement of the texture maps in pairs is possible. Consequently, each time steps S3-4 to S3-18 are performed for one of the sets 280-1 to 280-45, one set is generated for the next level of recursion containing only a single texture map. This is schematically illustrated in FIG. 6, which shows that the result of processing of each set 280-1 to 280-45 is a single texture map 220-1 to 220-45.

Consequently, when step S3-20 is performed after this processing, texture map generator 60 determines that each set at the next level contains only one texture map, and processing proceeds to step S3-22.

At step S3-22, texture map selector 90 selects the "best" single texture map 220 from among the forty-five generated single texture maps 220-1 to 220-45. In this embodiment, texture map selector 90 processes data defining the height and width of each texture map 220-1 to 220-45 to determine the single texture map 220 having the smallest area from those which also have a shape which is sufficiently square.

Figure 7:
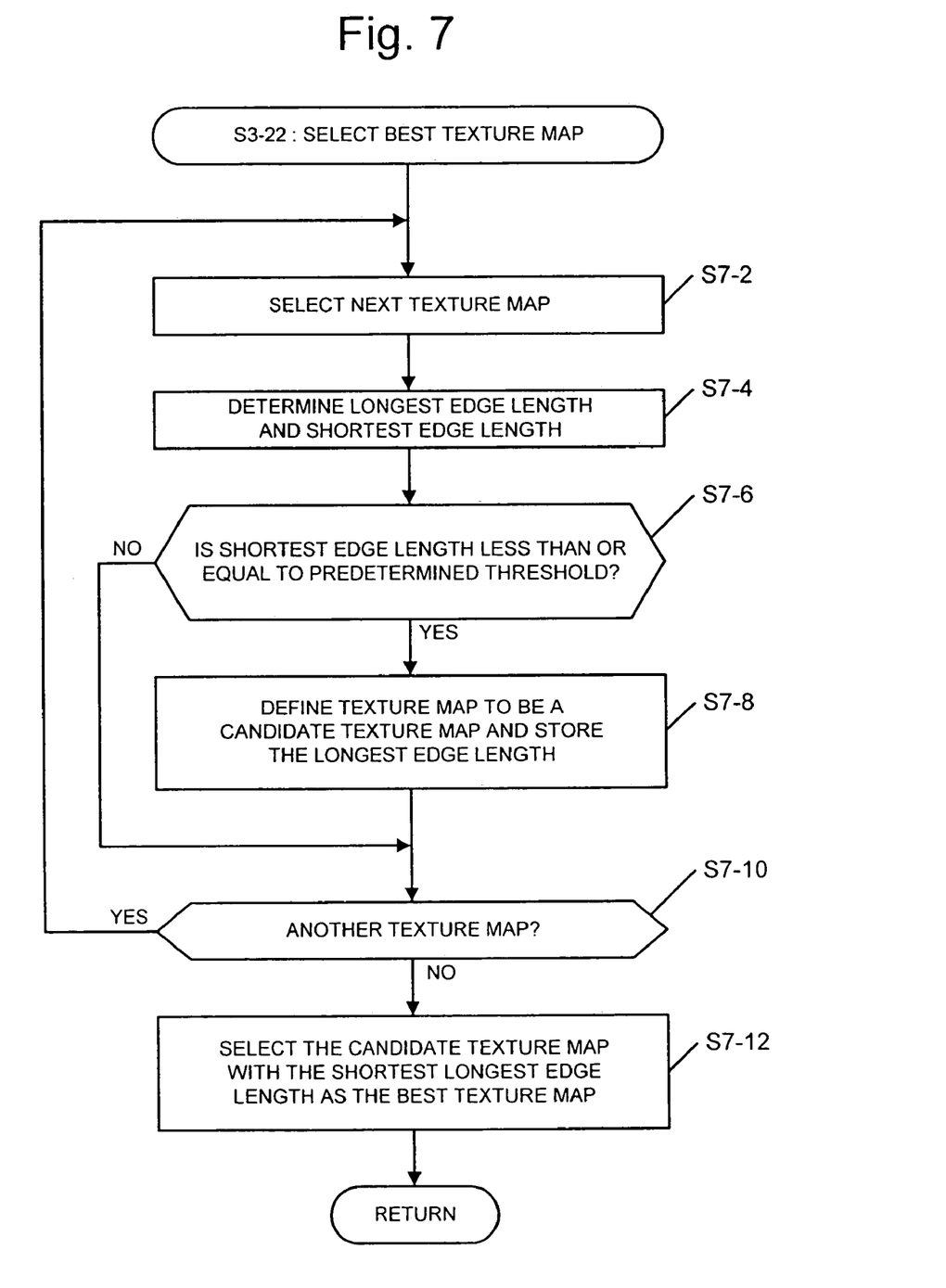
FIG. 7 shows the processing operations performed at step S3-22 in FIG. 3.

FIG. 7 shows the processing operations performed by texture map selector 90 at step S3-22.

Referring to FIG. 7, at step S7-2, texture map selector 90 selects the next texture map from the texture maps 220-1 to 220-45 for processing (this being the first of these texture maps the first time step S7-2 is performed).

At step S7-4, texture map selector 90 determines the length of the longest edge and the length of the shortest edge of the selected texture map.

At step S7-6, texture map selector 90 determines whether the length of the shortest edge is less than or equal to a predetermined threshold. The way in which this threshold is set will now be described.

The optimum single texture map 220 would comprise a square with an area equal to the sum of the respective areas of the input texture maps 200–208. Consequently, if the sum of the areas of the input texture maps 200–208 is S, then the length of each side of the optimum single texture map 220 would be $\sqrt{S}$. The predetermined threshold used at step S7-6 is therefore defined to be $\alpha\sqrt{S}$, where $\alpha$ defines an amount by which texture map 220 is allowed to deviate in practice from the optimum single texture map. In this embodiment, the value of $\alpha$ is set to 1.1, although other values are, of course, possible.

If it is determined at step S7-6 that the shortest edge length is less than or equal to the predetermined threshold, then processing proceeds to step S7-8, at which texture map selector 90 defines the texture map selected at step S7-2 to be a candidate texture map, and stores data defining the length of the longest edge determined at step S7-4.

On the other hand, if it is determined at step S7-6 that the length of the shortest edge is greater than the predetermined threshold, then the processing at step S7-8 is omitted, and the texture map selected at step S7-2 is discarded.

At step S7-10, texture map selector 90 determines whether there is another single texture map 220-1 to 220-45 to be processed. Steps S7-2 to S7-10 are repeated until each single texture map 220-1 to 220-45 has been processed in the way described above.

At step S7-12, texture map selector 90 selects the candidate texture map having the shortest longest edge length as the best texture map.

Referring again to FIG. 3, at step S3-24, central controller 20 controls output data interface 110 to output data defining the texture map selected at step S3-22, for example as data stored on a storage medium 112 or as data carried by a signal 114.

Many modifications and variations can be made to the embodiment described above within the scope of the claims.

For example, in the embodiment above, the starting texture maps 200–208 are input to processing apparatus 2. However, one or more of the texture maps 200–208 may be generated by processing apparatus 2 itself.

In the example illustrated for the embodiment above, five input texture maps 200–208 are processed. However, other numbers of texture maps (either odd or even numbers) may, of course, be processed.

In the embodiment described above, texture map generator 60 is arranged to perform exhaustive processing to generate and test each possible arrangement of texture map pairs at each level of recursion. However, instead, texture map generator 60 may be arranged to generate and test only a subset of the possible arrangements at one or more of the levels of recursion. In this way, the processing time and resources required when a large number of input texture maps are to be processed is reduced.

In the embodiment above, a pair of texture maps is tiled at step S3-10 by arranging the texture maps so that an edge of one texture map abuts an edge of the other texture map. However, if required, the texture maps may be arranged adjacent each other with a gap between the adjacent edges of the texture maps.

In the embodiment above, when a pair of texture maps is tiled at step S3-10, the bounding rectangle defining the generated combined texture block is defined with edges lying along the edges of the texture maps. However, instead, a rectangle may be defined with edges parallel to the edges of the texture maps to enclose the two texture maps, but with a gap between the edges of the texture maps and the edges of the rectangle.

In the embodiment above, at step S3-10, texture map tiler 80 selects one of the four tiled arrangements 250, 252, 254, 256 of texture map pairs by selecting the arrangement having the bounding rectangle of smallest area. However, in addition or instead, the selection may be based upon the squareness of each bounding rectangle (determined by comparing the length of the longest edge to the length of the shortest edge in each bounding rectangle).

In the embodiment above, texture map selector 90 selects a final texture map from the texture maps 220-1 to 220-45 using the processing described with reference to FIG. 7. However, the final texture map may be selected in other ways. For example texture map selector 90 may calculate the area of texture map 220-1 to 220-45 and select the texture map with the smallest area as the final texture map. Alternatively, texture map selector 90 may calculate the difference between the lengths of the shortest and longest sides of each texture map 220-1 to 220-45 and select the texture map having the smallest difference as the final texture map. Of course, texture map selector 90 may select the final texture map using a combination of these approaches.

Texture map generator 60 may be arranged to convert the final texture map selected at step S3-22 into a square texture map (if it is not already square) by adding padding to make the lengths of the sides of the texture map equal. Alternatively, to convert the final texture map selected at step S3-22 to a square, texture map generator 60 may map the four corners of the texture map onto the four corners of a square (although this will result in distortion to the texture data and the distortion will not be the same in the height and width directions of the texture map).

It will be understood that the term "rectangle" used herein includes a square. Thus, for example, one or more of the input texture maps 200–208 may be a square, and the bounding rectangle defined around each tiled pair of texture maps/texture blocks at step S3-10 may be a square (with the result that one or more of the texture blocks 210, 212, 214, 220 may be a square).

In the embodiment described above, processing is performed by a computer user processing routines defined by programming instructions. However, some, or all, of the processing could, of course, be performed using hardware.

The invention claimed is:

1. A method, performed in a processing apparatus, of processing data defining at least three two-dimensional rectangular texture maps to generate data defining a single two-dimensional rectangular texture map containing all of the starting texture maps, the method comprising:
    combining two of the texture maps by arranging them adjacent each other with an edge of one texture map parallel to an edge of the other texture map, and defining a rectangle containing the two texture maps, thereby generating a new texture map for subsequent combination; and
    repeating the combining processing to combine texture maps in pairs, to generate a single two-dimensional rectangle containing the starting texture maps,
    wherein the at least three two-dimensional rectangular texture maps that are combined include texture maps of different respective sizes.

2. A method according to claim 1, wherein, in the processing to combine each pair of texture maps, the rectangle defined to contain the two texture maps is the smallest rectangle which encloses the two texture maps.

3. A method according to claim 1, wherein the processing to combine each pair of texture maps comprises:
    defining a plurality of different arrangements of the two texture maps, with the texture maps in each arrangement being adjacent with an edge of one texture map parallel to an edge of the other texture map;
    defining a respective rectangle for each of the different arrangements, each rectangle containing the two texture maps; and
    selecting one of the different arrangements for subsequent combination in dependence upon the defined rectangles.

4. A method according to claim 3, wherein the arrangement having the defined rectangle of smallest area is selected for subsequent combination.

5. A method according to claim 1, wherein the processing is performed to combine the texture maps in a plurality of different ways to generate a plurality of single texture maps containing the starting texture maps, and wherein processing is performed to select one single texture map from the plurality of generated single texture maps.

6. A method according to claim 5, wherein the processing is performed to combine the texture maps in the plurality of different ways, which plurality comprises all possible arrangements of the texture maps.

7. A method according to claim 5, wherein the one single texture map is selected from the plurality of generated single texture maps in dependence upon the lengths of the sides of the generated single texture maps.

8. A method according to claim 5, wherein the one single texture map is selected from the plurality of generated single texture maps in dependence upon the areas of the generated single texture maps.

9. A method according to claim 1, further comprising generating a signal, either directly or indirectly, carrying the data defining the single texture map containing all of the starting texture maps.

10. A method according to claim 1, further comprising making a recording of the data defining the single texture either directly or indirectly.

11. Apparatus for processing data defining at least three two-dimensional rectangular texture maps to generate data defining a single two-dimensional rectangular texture map containing all of the starting texture maps, the apparatus comprising:
    a texture map combiner operable to combine two of the texture maps by arranging them adjacent each other with an edge of one texture map parallel to an edge of the other texture map and to define a rectangle containing the two texture maps, thereby generating a new texture map for subsequent combination; and
    a controller operable to control the texture map combiner to repeat the combining processing to combine texture maps in pairs, to generate a single two-dimensional rectangle containing the starting texture maps,
    wherein the at least three two-dimensional rectangular texture maps that are combined include texture maps of different respective sizes.

12. Apparatus according to claim 11, wherein the texture map combiner is operable to define the rectangle containing the two texture maps as the smallest rectangle which encloses the two texture maps.

13. Apparatus according to claim 11, wherein the texture map combiner comprises:
    an arrangement definer operable to define a plurality of different arrangements of the two texture maps, with the texture maps in each arrangement being adjacent with an edge of one texture map parallel to an edge of the other texture map;
    a rectangle definer operable to define a respective rectangle for each of the different arrangements, each rectangle containing the two texture maps; and
    an arrangement selector operable to select one of the different arrangements for subsequent combination in dependence upon the defined rectangles.

14. Apparatus according to claim 13, wherein the arrangement selector is operable to select the arrangement having the defined rectangle of smallest area for subsequent combination.

15. Apparatus according to claim 11, wherein the controller is operable to control the texture map combiner to perform the processing to combine the texture maps in a plurality of different ways to generate a plurality of single texture maps containing the starting texture maps, and wherein the apparatus further comprises a single texture map selector operable to select one single texture map from the plurality of generated single texture maps.

16. Apparatus according to claim 15, wherein the controller is operable to control the texture map combiner to perform processing to combine the texture maps in the plurality of different ways, which plurality comprises all possible arrangements of the texture maps.

17. Apparatus according to claim 15, wherein the single texture map selector is operable to select the one single texture map from the plurality of generated single texture maps in dependence upon the lengths of the sides of the generated single texture maps.

18. Apparatus according to claim 15, wherein the single texture map selector is operable to select the one single texture map from the plurality of generated single texture maps in dependence upon the areas of the generated single texture maps.

19. Apparatus for processing data defining at least three two-dimensional rectangular texture maps to generate data defining a single two-dimensional rectangular texture map containing all of the starting texture maps, the apparatus comprising:

combining means for combining two of the texture maps by arranging them adjacent each other with an edge of one texture map parallel to an edge of the other texture map and for defining a rectangle containing the two texture maps, thereby generating a new texture map for subsequent combination; and means for controlling the combining means to repeat the combining processing to combine texture maps in pairs, to generate a single two-dimensional rectangle containing the starting texture maps, wherein the at least three two-dimensional rectangular texture maps that are combined include texture maps of different respective sizes.

20. A storage medium storing computer program instructions for programming a programmable processing apparatus to become operable to perform a method as set out in any of claims 1 to 8.

21. A signal carrying computer program instructions for programming a programmable processing apparatus to become operable to perform a method as set out in any of claims 1 to 8.

* * * * *